(12) United States Patent
Brennan (10) Patent No.: US 11,209,087 B2
(45) Date of Patent: Dec. 28, 2021

(54) MULTI-SEAT GATE VALVE (71) Applicant: Franklin Valve, LP, Houston, TX (US)

(72) Inventor: John Brennan, Houston, TX (US)

(73) Assignee: FRANKLIN VALVE, LP, Houston, TX (US)

( * ) Notice: Subject to any disclaimer, the term of this patent is extended or adjusted under 35 U.S.C. 154(b) by 0 days.

(21) Appl. No.: 17/279,479

(22) PCT Filed: Sep. 28, 2018

(86) PCT No.: PCT/US2018/053459
§ 371 (c)(1),
(2) Date: Mar. 24, 2021

(87) PCT Pub. No.: WO2020/068120
PCT Pub. Date: Apr. 2, 2020

(65) Prior Publication Data
US 2021/0310567 A1    Oct. 7, 2021

(51) Int. Cl.
F16K 3/02    (2006.01)
F16K 3/14    (2006.01)
F16K 3/18    (2006.01)

(52) U.S. Cl.
CPC .............. *F16K 3/0281* (2013.01); *F16K 3/14* (2013.01); *F16K 3/18* (2013.01)

(58) Field of Classification Search
CPC ..... F16K 3/14; F16K 3/00; F16K 3/02; F16K 3/0272; F16K 3/029; F16K 3/10; F16K 3/12; F16K 3/0281; F16K 3/18; F16K 3/16
See application file for complete search history.

(56) References Cited

U.S. PATENT DOCUMENTS

| 2,827,260 A | 3/1958 | Virgil |
| 3,125,323 A | 3/1964 | Heinen |
| 3,662,778 A | 5/1972 | Leopold et al. |
| 3,695,578 A | 10/1972 | Walther et al. |
| 3,743,244 A | 7/1973 | Dickenson et al. |
| 3,848,621 A | 11/1974 | Dickenson et al. |
| 3,993,285 A | 11/1976 | Conley |
| 4,036,260 A | 7/1977 | Davis et al. |
| 4,188,014 A | 2/1980 | Alvarez |
| 4,538,640 A | 9/1985 | Acker |
| 5,055,026 A | 10/1991 | Gordon |
| 5,135,032 A | 8/1992 | Parks |

(Continued)

FOREIGN PATENT DOCUMENTS

| CN | 204437327 U | 7/2015 |
| GB | 345133 A | 3/1931 |

(Continued)

OTHER PUBLICATIONS

Copenheaver, Blaine R., International Search Report and Written Opinion for PCT App. No. PCT/US18/53459, dated Nov. 30, 2018, 7 pages, USPTO, Alexandria, VA.

(Continued)

*Primary Examiner* — Marina A Tietjen
(74) *Attorney, Agent, or Firm* — Crain, Caton and James (57) ABSTRACT A multi-seat gate valve with a pair of sealing members separated by a gate wherein each sealing member is secured between a bottom edge surface on the gate and a pair of locking members until the gate valve is at a fully closed position and proper seating is achieved.

14 Claims, 5 Drawing Sheets (56) References Cited

U.S. PATENT DOCUMENTS

| | | | |
|---|---|---|---|
| 5,195,722 | A | 3/1993 | Bedner |
| 5,236,345 | A | 8/1993 | Nevrekar |
| 5,820,106 | A | 10/1998 | Wurangian |
| 6,164,622 | A | 12/2000 | Partridge |
| 6,663,079 | B1 | 12/2003 | Bottenfield |
| 9,845,890 | B2 | 12/2017 | Paez |
| 2017/0114904 | A1 | 4/2017 | Szuster |
| 2017/0167621 | A1 | 6/2017 | Godwin et al. |
| 2017/0299068 | A1 | 10/2017 | Nguyen et al. |

FOREIGN PATENT DOCUMENTS

| | | | |
|---|---|---|---|
| GB | 1039027 | A | 8/1966 |
| GB | 1166947 | A | 10/1969 |
| KR | 101684881 | B1 | 12/2016 |
| WO | 2017/025329 | A1 | 2/2017 |
| WO | 2017/027001 | A1 | 2/2017 |
| WO | 2017/036672 | A1 | 3/2017 |

OTHER PUBLICATIONS

Tietjen, Marina, International Preliminary Report on Patentability for PCT App. No. PCT/US18/53459, dated Jul. 2, 2020, 17 pages, USPTO, Alexandria, VA.

Samson Controls, "API A/6D: Gate Valves" Mar. 9, 2016 (available at www.samsoncontrols.com/product/gate-valves), 4 pages, USA.

Flowserve, "Anchor/Darling Double-Disc Gate Valves 2 1/2 and over the T-head stem," User instructions, FCD ADENIM003-01, Jul. 2014 (available at www.flowserve.com/sites/defaut/files/2016-07/ADENIM0003-01-AQ_LR.pdf), 28 pages, USA.

AVK International A/S, "What is a gate valve," Jan. 27, 2017 (available at https://www.avkvalves.eu/en/insights/product-insights/gate-valves/what-is-a-gate-valve), 6 pages, Denmark.

MULTI-SEAT GATE VALVE

This application is a U.S. National Stage Application of PCT Patent Application Serial No. PCT/US18/53459, filed Sep. 28, 2018, which is incorporated herein by reference.

FIELD OF THE DISCLOSURE

The following disclosure generally relates to a multi-seat gate valve and methods for using a multi-seat gate valve. More particularly, the following disclosure relates to a multi-seat gate valve with a pair of sealing members separated by a gate wherein each sealing member is secured between a bottom edge surface on the gate and a pair of locking members until the gate valve is at a fully closed position and proper seating is achieved.

BACKGROUND

Various types of valves may be used to control the flow of fluids through a pipeline. If the fluid also includes a mixture of solids, then an adequate seal may be difficult to achieve. Various types of valves have been designed to address the problem associated with achieving an adequate seal in different fluid environments.

A gate valve typically includes a valve housing for the gate valve in a retracted (open) position and a fluid passageway for connection with a pipeline. As implied by the name, the valve operates like a gate by moving between an open position in the valve housing and a closed position in the fluid passageway. Once closed, the valve is substantially sealed and prevents or obstructs movement of the fluid through the fluid passageway. The ability to achieve an adequate seal is subject to various gate valve designs.

Most common multi-seat gate valves can be generally be categorized as either including a 2-piece gate valve design or a 3-piece gate valve design. The 2-piece gate valves basically include two gates that also act as a pair of sealing members. Both gates translate out, parallel to the flow, when the valve is expanding to seal. This puts a bending load on the stem and can cause premature wear on the packing, leading to leaks and increased emissions. The 3-piece gate valves basically include a pair of parallel sealing members and a wedge-shaped gate positioned between the pair of sealing members. Various means are employed to maintain the relative position between the pair of sealing members and the gate as the gate valve is operated between the open and closed positions. One means may be characterized as a rocker arm, which cannot be used on a 3-piece gate valve because the rocker arm requires the two gates to move against one another thus, disengaging the rocker arm and allowing the wedge shape of both pieces to drive the two apart and seal. Another common mechanism found on 3-piece gate valves uses springs, which increases the required thrust to seat the valve (increasing cost) and can lead to premature engagement of the sealing members when there is an obstruction.

BRIEF DESCRIPTION OF THE DRAWINGS

The present disclosure is described with reference to the accompanying drawings, in which like elements are referenced with like reference numbers, and in which.

DETAILED DESCRIPTION OF THE ILLUSTRATIVE EMBODIMENTS

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented. The multi-seat gate valve embodiments disclosed herein thus, may be used to control the flow of fluids through different types of pipelines in different orientations.

The multi-seat gate valve and methods disclosed herein overcome the prior art disadvantages associated with 2-piece and 3-piece gate valves by using a pair of sealing members separated by a gate wherein each sealing member is secured between a bottom edge surface on the gate and a pair of locking members until the gate valve is at a fully closed position and proper seating is achieved. In this manner, the disclosed multi-seat gate valve balances the loads, compared to a 2-piece gate valve, and prevents premature engagement of the sealing members when there is an obstruction.

In one embodiment, the present disclosure includes a multi-seat gate valve, which comprises: i) a body with a chamber and a fluid passage; ii) a gate positioned within the body, the gate including a pair of opposing non-parallel surfaces, a pair of opposing parallel surfaces, and a bottom edge surface; iii) a pair of sealing members, wherein each sealing member is secured between the bottom edge surface on the gate and a pair of locking members until the gate valve is at a fully closed position; and iv) wherein each locking member is detachably coupled to i) the gate until the gate valve is at the fully closed position or ii) the body only when the gate valve is at the fully closed position and each sealing member is in position to seal the fluid passage.

In another embodiment, the present disclosure includes a method for sealing a fluid passageway through a body, which comprises: i) moving a pair of sealing members, a pair of locking members and a gate from an open position toward a fully closed position within a chamber of the gate valve; ii) securing the pair of sealing members between a bottom edge surface on the gate and the pair of locking members until the gate valve is at the fully closed position;

and iii) releasing the pair of sealing members from between the bottom edge surface on the gate and the pair of locking members only when the gate valve is at the fully closed position and each sealing member is in position to seal the fluid passage.

Figure 1:
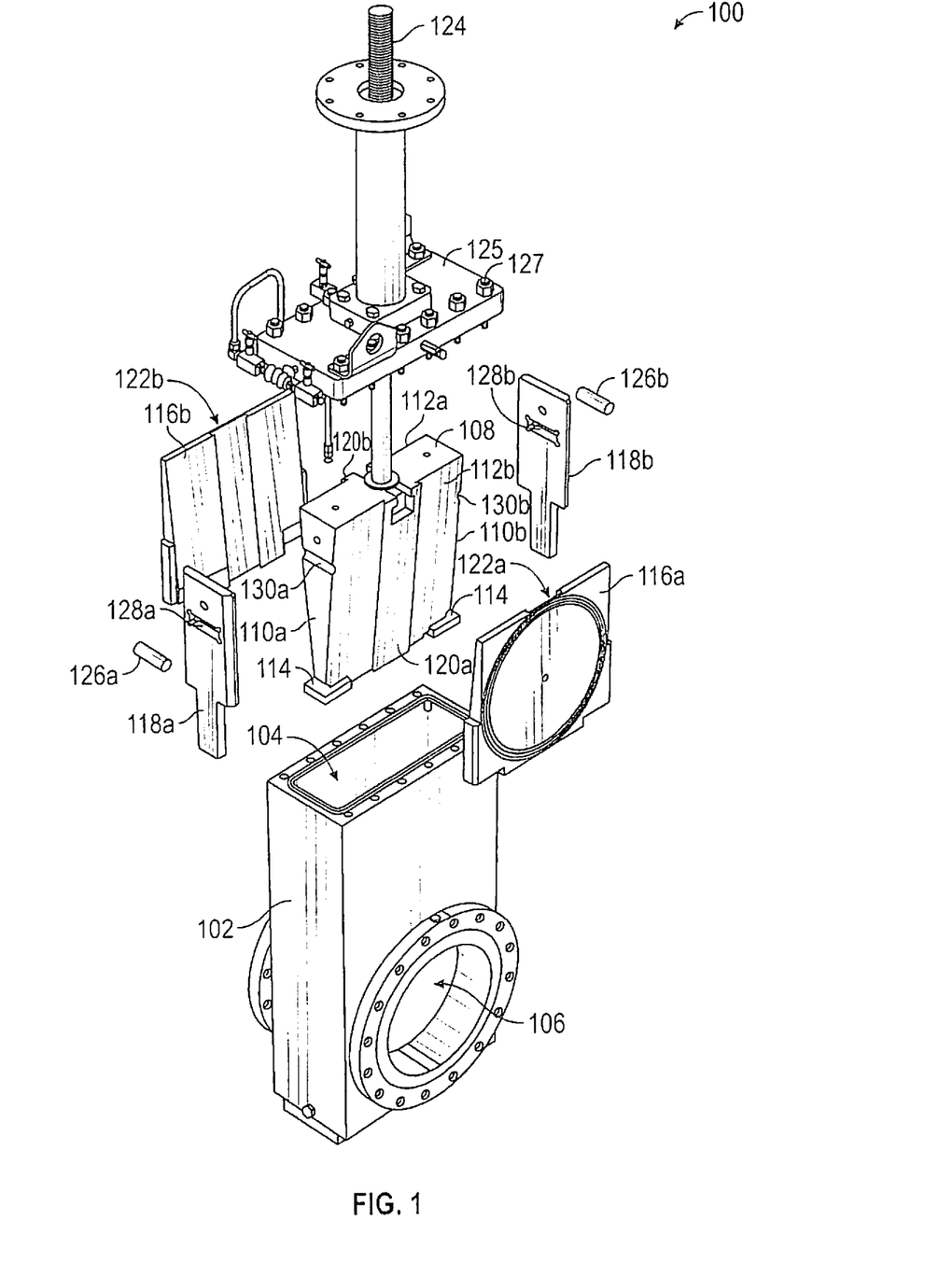
FIG. 1 is an exploded view of an exemplary embodiment of a multi-seat gate valve according to the present disclosure.

Referring now to FIG. 1, an exploded view illustrates an exemplary embodiment of a multi-seat gate valve 100. The multi-seat gate valve 100 includes a body 102 with a chamber 104 and a fluid passage 106. The multi-seat gate valve 100 also includes a gate 108 positioned within the body 102. The gate 108 includes a pair of opposing parallel surfaces 110a, 110b, a pair of opposing non-parallel surfaces 112a, 112b and a bottom edge surface 114. The multi-seat gate valve 100 further includes a pair of sealing members 116a, 116b secured between the bottom edge surface 114 on the gate 108 and a pair of locking members 118a, 118b. Each sealing member 116a, 116b is secured between the bottom edge surface 114 on the gate 108 and the pair of locking members 118a, 118b to prevent movement of each sealing member 116a, 116b relative to the gate 108 until the gate valve 100 is at the fully closed position. Each locking member 118a, 118b is detachably coupled to i) the gate 108 until the gate valve 100 is at the fully closed position or ii) the body 102 only when the gate valve 100 is at the fully closed position and each sealing member 116a, 116b is in position to seal the fluid passage 106. In this manner, the multi-seat gate valve 100 balances the loads, compared to a 2-piece gate valve, and prevents premature engagement of the pair of sealing members 116a, 116b when there is an obstruction.

Each sealing member 116a, 116b is slideably engaged with a respective one of the pair of opposing non-parallel surfaces 112a, 112b on the gate 108. Slideable engagement between each sealing member 116a, 116b and the gate 108 is accomplished, for example, by a tongue 120a, 120b formed on a respective one of the pair of opposing non-parallel surfaces 112a, 112b and a respective groove 122a, 122b formed in a respective one of the pair of sealing members 116a, 116b. Other structures capable of enabling slideable engagement, however, may be utilized. An operating shaft 124 is coupled or connected to the gate 108 for moving the gate 108 within the chamber 104 between an open position and the fully closed position. The gate valve 100 includes a top 125 that is secured to the body 102 by a plurality of bolts 127. In this manner, the chamber 104 is sealed to prevent any fluid passage other than through the fluid passage 106.

Each locking member 118a, 118b is detachably coupled to a respective one of the pair of opposing parallel surfaces 110a, 110b on the gate 108 by a respective pin 126a, 126b until the gate valve 100 is at the fully closed position and each locking member 118a, 118b is detachably coupled to a respective surface on the body 102 by the respective pin 126a, 126b when the gate valve 100 is at the fully closed position. Each locking member 118a, 118b includes a respective opening 128a, 128b therethrough and each opposing parallel surface 110a, 110b on the gate 108 includes a respective groove 130a, 130b therein. Each opening 128a, 128b is aligned with a respective groove 130a, 130b for receipt of a respective pin 126a, 126b in the respective opening 128a, 128b and the respective groove 130a, 130b until the gate valve 100 is at the fully closed position. Each respective surface on the body 102 includes a respective groove 202a, 202b (FIGS. 2-4) therein. Each opening 128a, 128b is aligned with a respective groove 202a, 202b for receipt of a respective pin 126a, 126b in the respective opening 128a, 128b and the respective groove 202a, 202b when the gate valve 100 is at the fully closed position.

Optionally, each locking member 118a, 118b may be detachably coupled to a respective one of the pair of opposing parallel surfaces 110a, 110b on the gate 108 by one or more respective ball bearings until the gate valve 100 is at the fully closed position and each locking member 118a, 118b may be detachably coupled to a respective surface on the body 102 by the one or more respective ball bearings when the gate valve 100 is at the fully closed position. In this embodiment, each locking member 118a, 118b includes a respective opening 128a, 128b therethrough and each opposing parallel surface 110a, 110b on the gate 108 includes a respective groove 130a, 130b therein. Each opening 128a, 128b is aligned with a respective groove 130a, 130b for receipt of the one or more respective ball bearings in the respective opening 128a, 128b and the respective groove 130a, 130b until the gate valve 100 is at the fully closed position. Each respective surface on the body 102 includes a respective groove 202a, 202b (FIGS. 2-4) therein. Each opening 128a, 128b is aligned with a respective groove 202a, 202b for receipt of the one or more respective ball bearings in the respective opening 128a, 128b and the respective groove 202a, 202b when the gate valve 100 is at the fully closed position.

In yet other embodiments, other objects with different geometric shapes and sizes than the pins and ball bearings described herein may be used to detachably couple each locking member 118a, 118b to a respective one of the pair of opposing parallel surfaces 110a, 110b on the gate 108 until the gate valve 100 is at the fully closed position and to detachably couple each locking member 118a, 118b to a respective surface on the body 102 when the gate valve 100 is at the fully closed position. Similarly, other geometric shapes and sizes than the grooves described herein may be used for receipt of the other objects with different geometric shapes and sizes than the pins and ball bearings described herein.

Figure 2:
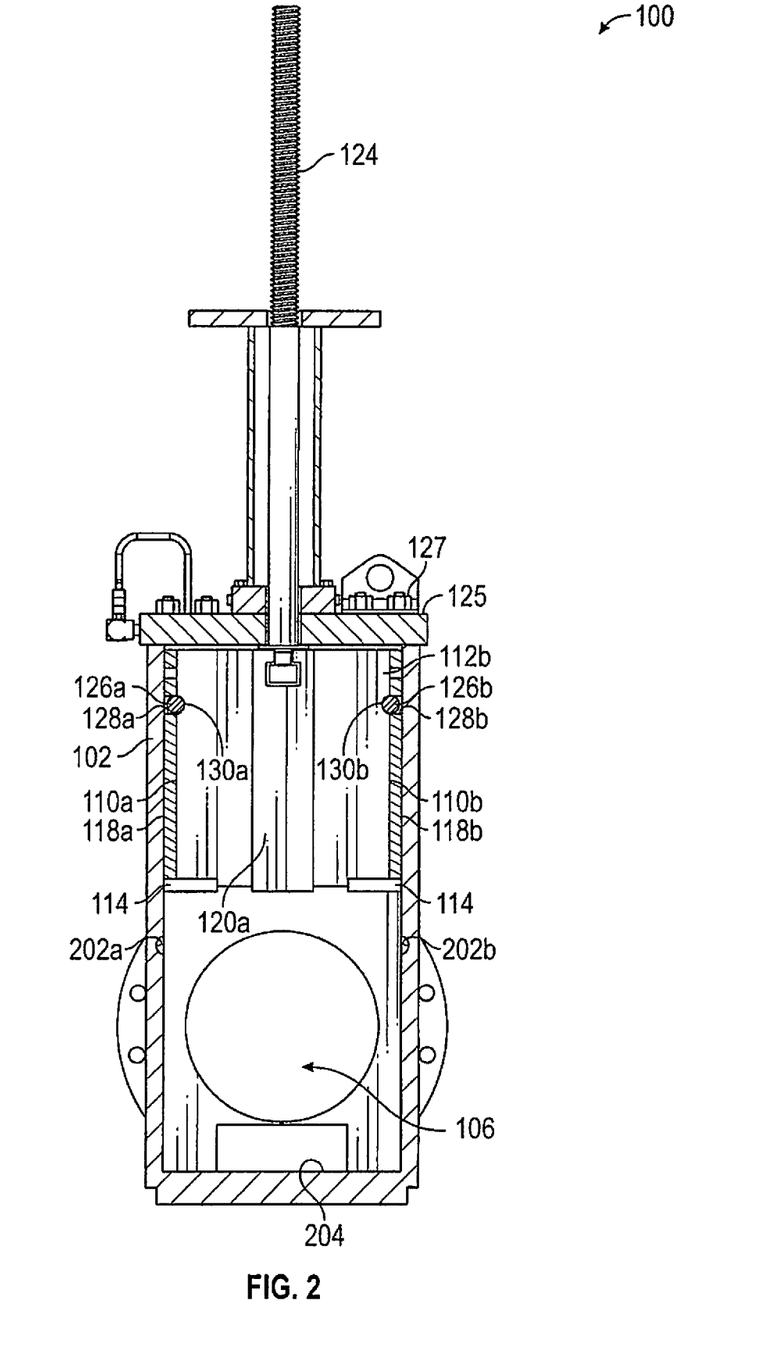
FIG. 2 is a cross-sectional view of the multi-seat gate valve in FIG. 1 at an open position.
Figure 3:
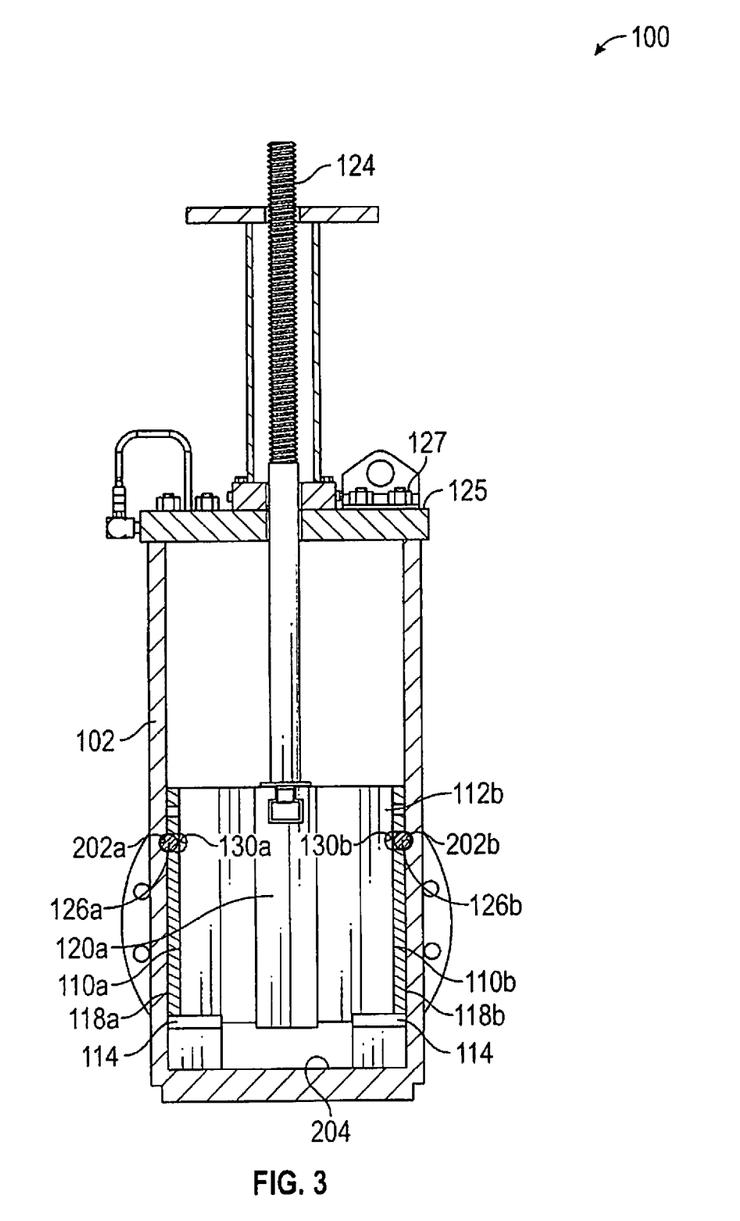
FIG. 3 is a cross-sectional view of the multi-seat gate valve in FIG. 1 at a fully closed position.

Referring now to FIGS. 2-3, a cross-sectional view illustrates the multi-seat gate valve 100 in FIG. 1 at an open position (FIG. 2) and at a fully closed position (FIG. 3). An open position is any position where the gate valve 100 is not at the fully closed position. A fully closed position is where each sealing member 116a, 116b is in position to seal the fluid passage 106. At the open position in FIG. 2, the pair of sealing members 116a, 116b are secured between the bottom edge surface 114 of the gate 108 and the pair of locking members 118a, 118b until the gate valve 100 is at the fully closed position in FIG. 3. The pair of locking members 118a, 118b are detachably coupled to the gate 108 by a respective pin 126a, 126b until the gate valve 100 is at the fully closed position. The design of each locking member 118a, 118b prevents movement of the pair of sealing members 116a, 116b in one direction relative to the gate 108 until the gate valve 100 is at the fully closed position. The bottom edge surface 114 on the gate 108 prevents movement of the pair of sealing members 116a, 116b in another direction relative to the gate 108 until the gate valve 100 is at the fully closed position. Once the pair of sealing members 116a, 116b, the pair of locking members 118a, 118b and the gate 108 reach the fully closed position in FIG. 3, wherein each sealing member 116a, 116b is in position to seal the fluid passage 106, the pair of sealing members 116a, 116b are released from between the bottom edge surface 114 on the gate 108 and the pair of locking members 118a, 118b. The pair of sealing members 116a, 116b are released from between the bottom edge surface 114 on the gate 108 and the pair of locking members 118a, 118b by detachably coupling each locking member 118a, 118b to a respective surface on the body 102 by a respective pin 126a, 126b. Because each opening 128a, 128b in a respective locking member 118a, 118b is aligned with a respective groove 202a, 202b in the body 102 when the gate valve 100 reaches the fully closed position, each pin 126a, 126b is received from its position in the respective opening 128a, 128b and the respective groove 130a, 130b in the gate 108 to a position in the respective opening 128a, 128b and the respective groove 202a, 202b in the body 102. A translation force is thus, generated by the surface of each respective groove 130a, 130b and each respective opening 128a, 128b when the gate 108 moves in relation to the locking members 118a, 118b. As a result, each locking member 118a, 118b is detachably coupled to a respective surface on the body 102 and the gate 108 is free to move relative to the pair of sealing members 116a, 116b and the pair of locking members 118a, 118b only in a direction toward a bottom 204 of the chamber 104.

Figure 4:
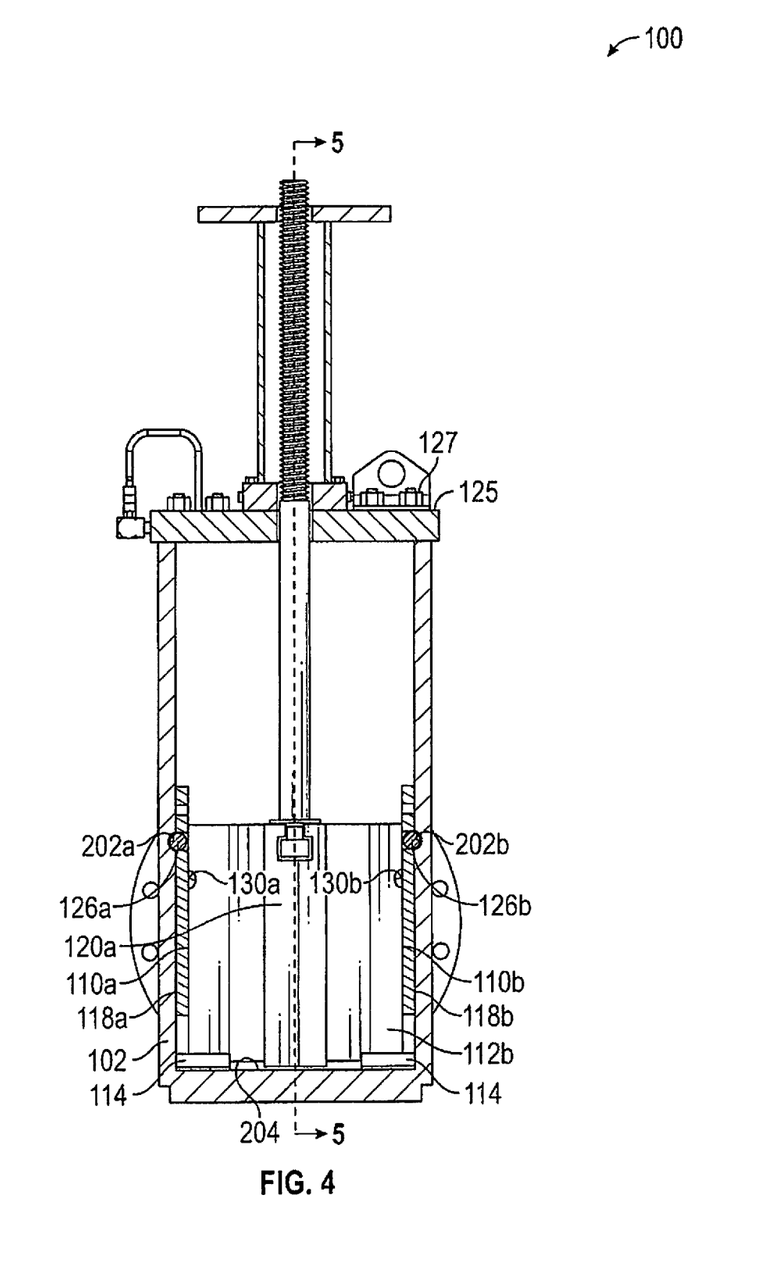
FIG. 4 is a cross-sectional view of the multi-seat gate valve in FIG. 1 at a fully sealed position.
Figure 5:
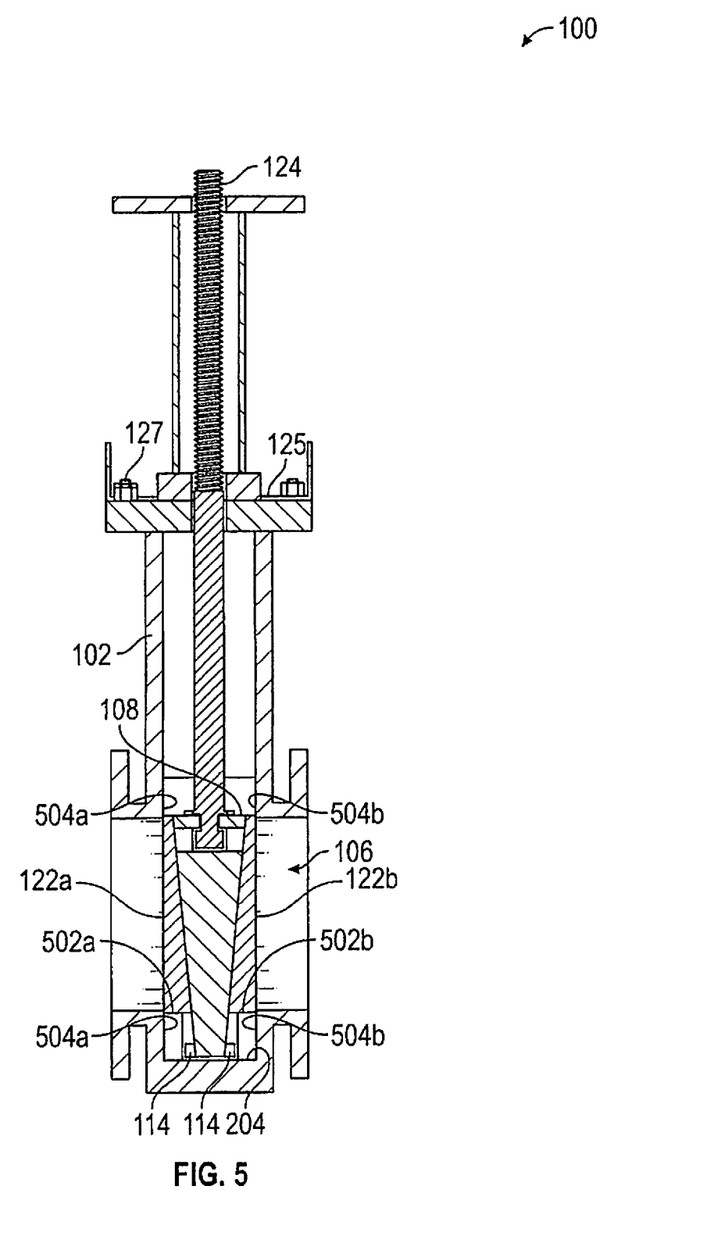
FIG. 5 is a cross-sectional view of the multi-seat gate valve in FIG. 4 along 5-5.

Referring now to FIGS. 4-5, a cross-sectional view illustrates the multi-seat gate valve 100 in FIG. 1 at a fully sealed position (FIG. 4) and the multi-seat gate valve 100 in FIG. 4 along 5-5 (FIG. 5). Once each locking member 118a, 118b is detachably coupled to a respective surface on the body 102, the gate 108, which is slideably engaged with the pair of sealing members 116a, 116b, moves only in a direction toward the bottom 204 of the chamber 104 until it reaches the fully sealed position in FIG. 4. At the fully closed position in FIG. 3 and at the fully sealed position in FIG. 4, the pair of sealing members 116a, 116b are prevented from further movement in a direction toward the bottom 204 of the chamber 104 by a respective shoulder 502a, 502b in the bottom 204 of the chamber 104. As the gate 108 progressively moves toward the bottom 204 of the chamber 104, the pair of sealing members 116a, 116b are forced into sealing engagement with a respective internal surface 504a, 504b of the body 102 surrounding the fluid passage 106. Typically a seal, such as an o-ring, is positioned on each sealing member 116a, 116b so that it engages a respective internal surface 504a, 504b to prevent any fluid from passing through the fluid passage 106. The wedge shape of the gate 108 and the corresponding inverted wedge shape of the pair of sealing members 116a, 116b enables the gate 108 to force the pair of sealing members 116a, 116b into sealing engagement with the respective internal surface 504a, 504b of the body 102 as the gate 108 progressively moves toward the bottom 204 of the chamber 104.

Once sealing the fluid passage 106 is no longer required, the gate 108 may be moved toward the top 125 of the gate valve 100 until it just passes the fully closed position in FIG. 3 where the pair of locking members 118a, 118b are detachably coupled to the gate 108 by a respective pin 126a, 126b in the manner described hereinabove. As a result, the pair of sealing members 116a, 116b will be resecured between the bottom edge surface 114 on the gate 108 and the pair of locking members 118a, 118b as the pair of sealing members 116a, 116b, the pair of locking members 118a, 118b and the gate 108 move past the fully closed position in FIG. 3 toward the open position in FIG. 2. Because each opening 128a, 128b in a respective locking member 118a, 118b is aligned with a respective groove 130a, 130b in the gate 108 when the gate valve 100 reaches the fully closed position, each pin 126a, 126b is received from its position in the respective opening 128a, 128b and the respective groove 202a, 202b in the body 102 to a position in the respective opening 128a, 128b and the respective groove 130a, 130b in the gate 108.

A translation force is thus, generated by the surface of each respective groove 202a, 202b and each respective opening 128a, 128b when the locking members 118a, 118b move in relation to the body 102.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A multi-seat gate valve, which comprises:
a body with a chamber and a fluid passage;
a gate positioned within the body, the gate including a pair of opposing non-parallel surfaces, a pair of opposing parallel surfaces, and a bottom edge surface;
a pair of sealing members, wherein each sealing member is secured between the bottom edge surface on the gate and a pair of locking members until the gate valve is at a fully closed position; and
wherein each locking member is detachably coupled to i) the gate until the gate valve is at the fully closed position and ii) only the body when the gate valve is at the fully closed position and each sealing member is in position to seal the fluid passage.

2. The multi-seat gate valve of claim 1, wherein each locking member is detachably coupled to a respective one of the pair of opposing parallel surfaces on the gate by a respective pin until the gate valve is at the fully closed position and each locking member is detachably coupled to a respective surface on the body by the respective pin when the gate valve is at the fully closed position.

3. The multi-seat gate valve of claim 2, wherein each locking member includes a respective opening therethrough and each opposing parallel surface on the gate includes a respective groove therein, each opening being aligned with a respective groove for receipt of a respective pin in the respective opening and the respective groove until the gate valve is at the fully closed position.

4. The multi-seat gate valve of claim 2, wherein each locking member includes a respective opening therethrough and each respective surface on the body includes a respective groove therein, each opening being aligned with a respective groove for receipt of a respective pin in the respective opening and the respective groove when the gate valve is at the fully closed position.

5. The multi-seat gate valve of claim 1, wherein each sealing member is secured between the bottom edge surface on the gate and the pair of locking members to prevent movement of each sealing member relative to the gate until the gate valve is at the fully closed position.

6. The multi-seat gate valve of claim 1, further comprising an operating shaft coupled to the gate for moving the gate within the chamber between an open position and the fully closed position.

7. The multi-seat gate valve of claim 1, wherein each locking member is detachably coupled to a respective one of the pair of opposing parallel surfaces on the gate by one or more respective ball bearings until the gate valve is at the fully closed position and each locking member is detachably coupled to a respective surface on the body by the one or more respective ball bearings when the gate valve is at the fully closed position.

8. The multi-seat gate valve of claim 7, wherein each locking member includes a respective opening therethrough and each opposing parallel surface on the gate includes a respective groove therein, each opening being aligned with a respective groove for receipt of a respective one or more ball bearings in the respective opening and the respective groove until the gate valve is at the fully closed position.

9. The multi-seat gate valve of claim 7, wherein each locking member includes a respective opening therethrough and each respective surface on the body includes a respective groove therein, each opening being aligned with a respective groove for receipt of a respective one or more ball bearings in the respective opening and the respective groove when the gate valve is at the fully closed position.

10. The multi-seat gate valve of claim 1, wherein each sealing member is slideably engaged with a respective one of the pair of opposing non-parallel surfaces on the gate.

11. A method for sealing a fluid passage through a multi-seat gate valve, which comprises:
   moving a pair of sealing members, a pair of locking members and a gate from an open position toward a fully closed position within a chamber of the gate valve;
   securing the pair of sealing members between a bottom edge surface on the gate and the pair of locking members until the gate valve is at the fully closed position; and
   releasing the pair of sealing members from between the bottom edge surface on the gate and the pair of locking members only when the gate valve is at the fully closed position and each sealing member is in position to seal the fluid passage.

12. The method of claim 11, further comprising sliding the gate between the pair of sealing members to seal the fluid passage.

13. The method of claim 12, further comprising:
   resecuring the pair of sealing members between the bottom edge surface on the gate and the pair of locking members; and
   moving the pair of sealing members, the pair of locking members and the gate from the fully closed position toward the open position within the chamber of the gate valve.

14. The method of claim 11, wherein each locking member is detachably coupled to i) the gate until the gate valve is at the fully closed position or ii) the body only when the gate valve is at the fully closed position.

* * * * *